United States Patent Office 3,463,616
Patented Aug. 26, 1969

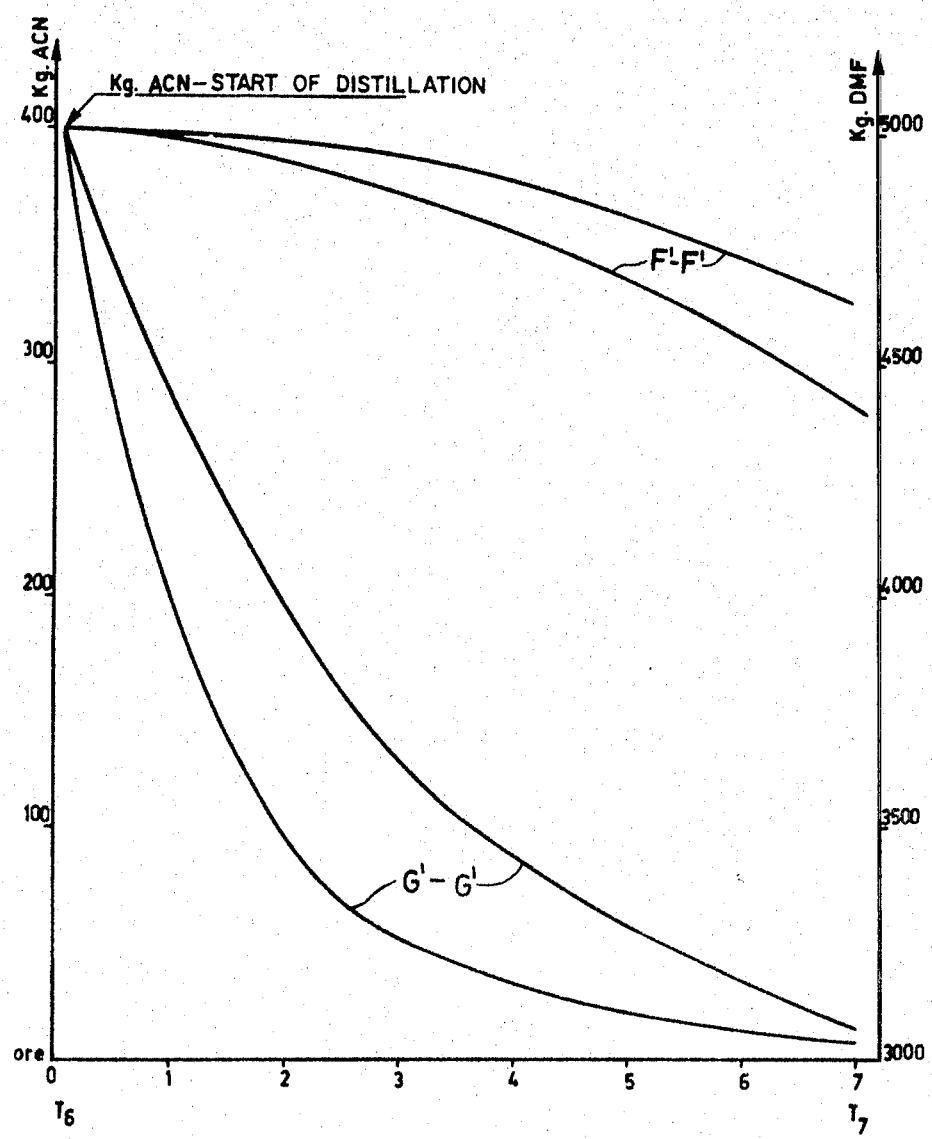

3,463,616
APPARATUS FOR THE INDUSTRIAL PRODUCTION OF SPINNABLE ACRYLONITRILE-BASED POLYMERS
Demetrio Corradi, Varedo, and Alberto Pasin, Maderno, Italy, assignors to Snia Viscosa Società Nazionale Industria Applicazioni Viscosa S.p.A., Milan, Italy, a company of Italy
Filed Mar. 18, 1966, Ser. No. 535,473
Claims priority, application Italy, Feb. 7, 1966, 14,227/66
Int. Cl. B01d 3/42, 3/00
U.S. Cl. 23—263          5 Claims

ABSTRACT OF THE DISCLOSURE

For production of a spinnable solution of a copolymer containing polyacrylonitrile, a mixer is provided for mixing a metered volume of a solvent, such as dimethylformamide, with a metered volume of acrylonitrile. From the mixer the solution flows to tanks from which it is selectively delivered through a heat exchanger to a plurality of reactors. The individual reactors are connected to tanks from which metered volumes of methyl methacrylate and of sodium allylsulphonate and dimethylformamide can be fed into the reactors. The outlets of all the reactors are connected to a single distiller. From the distiller the spinnable solution is fed to the spinneret. The unreacted acrylonitrile and excess solvent are returned through a condenser and a metering device to the mixer.

---

This invention generally relates to the preparation on an industrial scale, of spinnable solutions of polymers, copolymers and grafted polymers, for the subsequent production of fibers and yarns from derivatives of acrylic acid. More particularly, the present invention relates to the identification and the solution of technical problems attendant to the preparation on an industrial scale, of spinnable solutions of copolymers having a high acrylonitrile content, higher than 85% by weight of solids, in dimethylformamide.

The principal subject matter of the invention are a process and an installation adapted to the production, on an industrial scale, of a solution of the kind and for the use referred to above. Another feature of the invention is the adoption of certain critical conditions (whose identification is a fundamental and vital feature of the invention), for a copolymerization process in an environment and under conditions such as directly to obtain a solution ready to be sent to the extrusion spinning means and to subsequent coagulation, which are steps known in the art and are not themselves a part of the present invention.

Applicants have long since ascertained the possibility of obtaining spinnable solutions from acrylonitrile-based copolymers without resorting to the conventional sequence of steps which includes treatments, in different times and environments, for the polymerization, the separation of the converted fraction of the starting comonomers, and the formation of the copolymer solution under spinnability conditions. The Italian Patent No. 501,674 disclosed and claimed a process for the preparation of spinnable solutions of polymeric products, which process essentially involved dissolution of monomer in a solvent capable of dissolving also the relevant polymer, and that polymerization was then carried out in the presence of an appropriate catalyst. Said patent specified acrylonitrile as the monomer, indicating, among the solvents, lactones, dimethylformamide and mixtures of nitromethane and formamide. Several peroxides, preferably soluble in solvents for acrylonitrile, had been provided for as catalysts.

In the light of said studies and initial discoveries, the possibility had been identified of obtaining, on completion of the polymerization run and in the same reaction environment, the separation on the unreacted monomer, an already spinnable solution being thus obtained. Subsequent studies and a more intensive and long testing have permitted gradual adaptation of these ideas to actual industrial exploitation of the invention. Subsequent complementary inventions, forming the subject-matter of other patents or patent applications, have enabled identification of a few favorable conditions in the reaction environment (temperatures, pressures, etc.) and of a few advantageous sequences in subsequent additions of solvents and catalysts, so as to obtain a few favorable conditions for polymerization and fractional conversion of the comonomers.

It is known, on the other hand, that the transfer and the application of new and useful principles of science and also of technical suggestions to the field of industrial practice, often require the solution of problems which do not appear in the experimental field, a solution which comprises both the identification and the precise formulation of the problem, whose existence was unpredictable, along with the use of an inventive faculty which goes far beyond simple search and repetition of tests. It should be borne in mind, in fact, that a process, if it is to have an actual industrial application and give tangible advance over the prior art, must fulfill numerous conditions in addition to those connected with the merely economical factors of production. For example, it is imperative to identify critical conditions and limitations such as to ensure the obtention of rigorously uniform production. It is also necessary to identify the possibility of advance checking operations to prevent any irregular development of processes and phenomena, so as to establish in advance those corrections which are adapted to overcome the effects of variations of initial conditions and other phenomena which fall in the unavoidable number of uncontrollable and unpredictable variables. More particularly, it is extremely disadvantageous to subordinate a correction operation (which should be carried out in an initial step of a process of the kind considered herein) to the result of checking the final product in an installation intended for substantially continuous operation on an industrial scale, that is when, at the instant of checking, a large amount of materials and intermediate products has already passed over said initial steps, that is when they are already in a condition conducive to a fatally defective product.

In order to have a better understanding of the following, it is necessary to bear in mind that the inventive process is initially divided into three principal steps, viz.:

A. Preparation of the starting materials in the formulations and under the conditions which are most favorable to their subsequent association in the reaction environment. These materials, in practice, are comonomers (acrylonitrile, methylmetacrylate, and allylsulphonate, generally sodium allylsulphonate) and the solvent, more frequently dimethylformamide. These conditions have a bearing both on the development of the subsequent reactions and operations and on the quality and physico-chemical and tinctorial properties of the yarns which can be produced.

B. Priming and controlled development of the copolymerization reaction so as to obtain the desired degree of polymerization and conversion ratio, as selectively predetermined, of the comonomers.

C. Removal from the reaction environment of the unreacted monomer fractions under presettable and selectively controlled conditions, so as to obtain the copolymeric solution under the most favorable possible conditions for being spun, bearing in mind that the distilled fractions contain a considerable amount of dimethylformamide (about 70%) and thus they require the addition of acrylonitrile in order that the most favorable ratio for recycling may be attained.

According to the invention, critical conditions have been identified for each of said main steps, said conditions having a strict relationship with the critical conditions attendant to any other steps. This interrelationship between critical conditions of groups of steps which are only seemingly independent from each other, enables, from the very outset establishment of certain limits which are such as to influence the final result of the process.

The individual steps and groups of steps will be described and discussed later on, along with operative examples thereof. At any rate and broadly stated, the inventive process comprises:

(1) Preparation, in advance, of stabilized and distilled acrylonitrile, in the state of solution in dimethylformamide under certain determined ratios, and; preferably, the holding of a solution so prepared in a reservoir. If, during the preparation of the solution of acrylonitrile in dimethylformamide, small variations of these ratios take place, said variations being such, as in themselves, to vary the composition of the solution far from the most desirable values, the holding of the solution in the reservoir generally is able statistically to smooth out said variations, thus bringing the average composition obtained in said environment to the desired values again. However, in order to effect a direct check of the concentration of said solution, samples of the solution can be taken in the environment wherein it is being prepared and, whenever necessary, it is possible to make additions of solvent or of monomer thereto so as to restore the concentration to the desired values.

It is possible, moreover, to introduce in the same environment wherein the solution is being prepared, amounts of the solution of acrylonitrile and dimethylformamide coming from the final stage of the process, that is from the distillation stage, still retaining the possibility of checking and adjusting the concentration of the solution to be sent to the reactor subsequently. The process according to the invention, moreover, comprises the preparation of commercial methylmetacrylate and of commercial allylsulphonate under conditions of high purity, preferably obtained, as specified hereinafter, in the form of a practically saturated solution in dimethylformamide, and then the metered flow of said three comonomers into the reaction environment, more particularly into a reactor equipped with a stirrer and with suitable control and inspection devices. Since any modifications of the degree of vacuum and the stoppage of the stirrer could cause serious damage, the stirrer and the vacuum pumps should be selectively actuated by two distinct sources of power.

(2) Preparation in advance of the reactor in a preselected critical condition of negative pressure and inert gas atmosphere. In practice, according to a preferred embodiment of the invention, the reactor is filled to saturation with dry nitrogen, and then its content is partially drawn out until the desired negative pressure is attained: by resorting to said negative pressure the starting materials are then drawn into the reactor. The reaction is primed by introducing the catalyst(s) and the trend and the temperature of the reaction are kept under control, according to a predetermined sequence, by controlling the value and the variations of the residual pressure within the reactor.

(3) Completion of the polymerization process in subsequent stages, due to the sequential introduction, in predetermined times and amounts, of dimethylformamide and catalyst, until attaining the desired degree of conversion and polymerization.

(4) Carrying out the polymerization reaction at the boiling point of the reacting mass. This condition ensures the control of the temperature of the reacting mass since the evolution of heat, due to the exothermic nature of the reaction, causes the continuous distillation of the unconverted fraction of the monomers with the due amount of solvent, the composition of the distillate being a function of the vapor pressure of its components. The vapors of the acrylonitrile/dimethylformamide (ACN/DMF) distillate are thus condensed on passing through a reflux condenser and brought to the reactor again in the liquid state. This mode of operation of the reaction permits dissipating the heat evolved therefrom, said heat being removed by the effect of the reflux distillation phenomenon. The variations of the residual pressure within the reactor, which are suitably programmed, ensure the predetermined value of the temperature in the different instants of time in which the polymerization process takes place. The exploitation and control of the boiling temperature by adjusting the residual pressure, are parameters of paramount importance to the regular progress of the reaction in the predetermined most favorable conditions with a view to the service of the installation on an industrial scale and to production on an industrial scale also.

(5) On completion of the controlled polymerization process, the removal by distillation of virtually all the unreacted monomer accompanied by a metered amount of solvent is carried out, so as to obtain the copolymer solution under the conditions which are necessary for its being directly sent to spinning, after de-aeration and filtration. The unreacted monomer fractions and the extracted solvent make up a new solution which can be sent directly to said reservoir, in which samplings are occasionally carried out to determine the solvent to solute ratios and to adjust, if necessary, said ratios so as to bring them again to the critical conditions suggested by this invention.

According to an important feature of the invention, the distillation stage is carried out in an environment which is separate from that in which the polymerization stage is performed. This fact permits obtaining two important advantages from both the technical and the economical standpoints:

(1) Inasmuch as the distillation stages take a considerable time, said time is subtracted from the one of actual utilization of the reactor(s), an improved efficiency of the installation being the result.

(2) Since the polymerization and distillation stages require quite different control implementations and different operational and environmental conditions, the necessity is removed of having a very intricate implementation equipped with all the means fulfilling the specific requirements of both stages, while the two separate environments can, each, fully respond to most favorable conditions for correct development and control of each stage.

According to another feature of the invention, two or more reactors are used, which operate in parallel and from which the solution of the polymerized product is caused concurrently to flow into a single distillation vessel. This fact is conducive to further important technical and industrial advantages, viz:

(1) While it is obviously convenient, for constructional and safety reasons, to maintain the capacity of the individual reactors within non excessive limits, the environment in which distillation is carried out is not subjected to these limitations. It is thus possible to build and operate an installation having, for a given throughput, fewer component parts.

(2) The phenomenon of polymerization is always subjected to variable and non controllable influencing factors. An extremely accurate control of the reaction, such as to ensure a result constantly confined within narrow qualitative limits, would lead to very high production costs. It has been ascertained, however, that, from a statistical standpoint, it is possible to obtain average values constantly contained within said limits even from a limited succession of polymerization runs. Therefore, by simultaneously operating a plurality of reactors, for example four, connected to a single distillation unit, the solutions concurrently flowing into the distillation unit will have, qualitatively, the average values individually exhibited by the individual inflowing streams, and said values will be contained within said narrow desired limits which can be predetermined on a statistical basis.

A few suggestions, in tabular form, are given below for the mode of operation and conditions for performing the first group of stages.

TABLE 1.—SOLUTIONS OF ACRYLONITRILE IN DIMETHYLFORMAMIDE (Indicated in the following with the symbols ACN and DMF, respectively)

| Example: | Sol. percent by wt., ACN | Remarks |
|---|---|---|
| A/I | 20 | Unsuitable since it gives low yields and low polymers which are easily degraded. |
| B/I | 30 | Long reaction times with uncontrollable formation of undesirable polymers. |
| C/I | 50 | Advantageous ratio which permits obtaining the most satisfactory reaction, low react. times and high yields. |
| D/I | 60 | Economically advantageous: the control of the exothermic process is however harder. |
| E/I | 80 | The control of high-capacity autoclaves is very difficult. |

The solution of ACN in DMF is preferably stored in suitable storage tanks (or put "in stock" as usually said in the art). This storage of the solution, even though it is seemingly in contrast with the theoretical suggestions for the continuous-run processes, leads to important advantages as outlined above.

Methylmetacrylate (indicated hereinafter by the symbol MM) can be used in the commercially available forms and conditions. It does not require, therefore, any particular comment, in itself, to the end of demonstrating the industrial practicability of this invention.

It has been ascertained, on the contrary, that tangible industrial results can be achieved only if the third comonomer, that is allylsulphonate, is utilized in a state of extreme purity which is not commercially obtainable.

Said degree of purity, to the end of attaining said results, can be estimated as not less than 98% and preferably 99%.

According to a complementary aspect of the invention, instead of proceeding with a cumbersome sequence of dissolution and crystallization operations according to the known art, and bearing in mind that, to the ends of the instant process, sodium allyl sulphonate dissolved in dimethylformamide is utilized, the necessary degree of purity of said comonomer is obtained by carrying out a separation, with dimethylformamide, of the ALSNA (sodium allyl sulphonate) from the salts admixture (sodium chloride, sodium allyl sulphonate and the secondary products of the reaction, plus traces of sodium sulphite) obtained from the reaction between allyl chloride or, possibly, bromide or iodide, and sodium sulphite in the most desirable reaction conditions.

Said advantageous mode of preparation in advance of sodium allyl sulphonate having a degree of purity which is higher than that of the commercial product can be briefly suggested by bearing in mind that ALSNA is soluble in dimethylformamide, while the above enumerated remaining salts are wholly insoluble therein, thus obtaining, on completion of centrifugation and filtration, a clear solution of ALSNA in DMF having a very high purity rating. It is thus obvious that said comonomer, under the conditions which are necessary to the ends of the instant process, can be obtained with a purity in the order or magnitude of 99%, by a simple and rapid operation, and is obtained in a virtually pure state in a dissolution step followed by a centrifugation and filtration step.

Sodium allyl sulphonate is preferably prepared in advance, to be introduced in the reactor environment; and for association with the other comonomers is introduced in solution in DMF at a concentration in the order of 6%, that is, virtually in saturation at a temperature of 20° C.

It has been indeed ascertained that it is preferable to employ saturated solutions of ALSNA in DMF, since by so doing variations of concentration in time are overcome, even though the temperature of the solution mass, while waiting to be fed into the reactor, undergoes variations of 3° C.–5° C.

This consistancy of concentration ensures in turn the preservation of preselected ratios between ACN and DMF in the reactors, since, obviously, the DFM solvent of ALSNA is added, within the reaction mass, to the DMF solvent of the ACN. The advantages of utilizing the same solvents for the two comonomers are apparent and they are associated to those stemming from the high purity of ALSNA and the mode of preparation thereof in a saturated solution in DMF.

It has been ascertained that, by the preparation of the comonomers in advance as hereinbefore described, and with the previous checks of the state in which they should be fed into the reactor environment, it is possible to establish industrially favorable initial conditions in that any necessity is overcome of more cumbersome controls of the concentrations and the ratios of the mixture to be subjected to the polymerization process.

As indicated at the outset, since the copolymer which is present in the spinnable solution under consideration in this invention has a content of polyacrylonitrile higher than 85% and the two comonomers which remain must amount together to not more than 15% of total, in said copolymer, said two comonomers, individually, should preferably represent, for methyl metacrylate, from 6% to 10% and, for allyl sulphonate, from 1% to 3% of the total, expressed on a weight basis and in the state of dry substance.

According to a feature of this invention, which results in a partial integration and important improvement over individually known elements, but which till now are mutually identified in their integration, the polymerization is carried out so as to obtain a virtually total conversion of methyl metacrylate and allyl sulphonate, but still with a partial and preselected conversion only of acrylonitrile. Therefore, in view of the particular mode of evolution of the reaction, as described hereinafter, a character of extreme criticality is taken by the ratio in which the comonomers should be initially associated and present in the reaction environment before starting the reaction itself.

These ratios become apparent from the examination of the following:

TABLE II

| | ACN percent | MM percent | ALSNA percent | DMF percent | Remarks |
|---|---|---|---|---|---|
| Example: | | | | | |
| A/II | 30 | 2 | 1 | 67 | Excessive slowness of polymerization and lack of homogeneousness of the soln. The fibres as produced have a high elongation and a high tinctorial substantivity. |
| B/II | 45 | 2 | 2 | 51 | A composition conducive to fibres having outstanding tinctorial characteristics. |
| C/II | 50 | 5 | 0.33 | 44.67 | Resistant fibres, having high elongation and poor tinctorial properties. |
| D/II | 50 | 2.45 | 0.55 | 47 | A composition conducive to the obtention of fibres having good average characteristics. |
| E/II | 60 | 3.5 | 0.6 | 35.9 | Do. to fibres adapted for special industrial applications. |
| F/II | 80 | 2 | 0 | 18 | A composition conducive to brittle, undyeable fibres. |

According to another essential feature of the invention, the technical problems inherent in the control of the conditions and the development of the reaction have been solved by determining in advance the conditions under which the polymerization reaction evolves and proceeds, on the basis of the value of the pressure, lower than the atmospheric pressure, which is established, maintained and caused to vary, according to a preselected sequence, in the reactor environment. Said control possibility obviously affords great advantages from the standpoint of industrial production, since any intermediate withdrawal of materials from the reactor is avoided during operation, as well as control of sampled out material, a control which, irrespective of its results, would give a behindhand indication without permitting timely intervention to such an extent as to be able to correct the result of the operation.

The following table shows the initial values of the negative pressure (expressed in torrs=mms. of mercury, residual) preset and maintained within the reactor at the time of introduction of the catalyst and thus, practically, at the very beginning of the reaction.

TABLE III

| | Torr (residual mms. Hg) environmental pressure | Starting mixture (Table I) | ACN solution (Table II) |
|---|---|---|---|
| Example: | | | |
| A/III | 250 | B/I | A/II |
| B/III | 350 | C/I | D/II |
| C/III | 450 | D/I | E/II |
| D/III | 150 | A/I | |
| E/III | 375 | C/I | C/II |

In the above table it is possible to observe a few examples of initial environmental conditions within the reactor wherein several compositions have been introduced, which correspond to a few examples among those reported in Table II, in different concentrations of ACN and DMF solutions which, in turn, correspond to examples reported in Table I.

In general, the values of the negative pressure have been established so that, bearing in mind the composition of the mixture, the different boiling points of the solute and solvent components and the different degrees of concentration, conditions are established under which, at preselected temperatures, a controlled state of ebullition is established.

The temperatures which are most favorable for preparing the mass in advance at the outset of the polymerization process have been identified. The preferred ranges for these temperatures, which obviously differ depending both on the value of the negative pressure obtained within the reactor and on the values of composition and concentrations of the solution mixtures present in said reactor, are reported in the following table, for the examples of Table III.

TABLE IV

| | Example (Table III) | Preferred lower limit, °C. | Temperature range upper limit, °C. |
|---|---|---|---|
| Example: | | | |
| A/IV | A/III | 65 | 68 |
| B/IV | B/III | 62 | 65 |
| C/IV | C/III | 60 | 63 |
| D/IV | D/III | 67 | 69 |
| E/IV | E/III | 62 | 65 |

The advance preparation of the reaction mass under the above tabulated initial thermal conditions can be achieved by different means, both by heating the reactor itself and by preheating the mixtures and the solutions to feed thereinto. Preferably, inasmuch as the mass to be treated is mainly formed by the solution of ACN in DMF, said preheating can be limited to the latter solution, and obtained by causing said solution to pass through a heat-exchanger when it is being transferred from the storage tank to the reactor.

The polymerization stage is primed by the introduction of the catalysts, under control of the state of stirring and of ebullition of the mixture. The control of these conditions, which can be carried out visually through peepholes arranged through the reactor walls, ensures an immediate and homogeneous spreading of the catalysts and a corresponding even starting of the reaction in each and every point of the mass.

The reaction, of a radical exchanging nature, can be obtained with the use of several catalysts and admixtures thereof. As a rule, peroxides are used as catalysts, such as lauroyl peroxide, benzoyl peroxide, allyl peroxide, "Genitron" (azo-butyronitrile, $C_3H_{12}N_4$).

These catalysts can be fed in under different conditions, both in the state of dry powder and in the state of solution in dimethylformamide, the latter condition being preferable as a rule in that it ensures a quicker and more homogeneous dispersion within the mass.

A condition which must be fulfilled in any case is a rapid introduction and an equally rapid and homogeneous dispersion of the catalyst.

The following table reports examples of catalysts and of conditions of introduction thereof in the reaction mass. These examples of catalyst can be adopted in practice for each of the compositions and initial conditions as previously exemplified, but the preferred conditions for a most satisfactory evolution of the industrial process are also shown in the table below.

TABLE V

| Example | I<br>Catalyst | II<br>State | III<br>Init. condit. temperature | Remarks |
|---|---|---|---|---|
| A/V | Lauroyl peroxide | Soln. in DMF from 3% to 10% | From 60° C. to 70° C | |
| B/V | "Genitron" (azo-isobutyronitrile). | Soln. in DMF from 1% to 3% | From 55° C. to 70° C | Gives rise to a slight green color in the spinnable solutions. |

The evolution of the reaction is controlled by programming the two essential conditions, namely:

(1) Control, according to a predetermined sequence of variations, of the gauge pressure within the reactor. Said control can be carried out continually by a suitable pressostat device whose output signals are fed into programming devices, e.g. cam devices, which pilot vacuum-forming means and other devices capable of assuring in any point of time the maintenance of the negative pressure within the programmed values as a function of time;

(2) By a programmed and subsequent introduction of predetermined additional amounts of solvent and catalyst. The idea of causing the polymerization of the comonomers to take place in at least two sequenced stages, in order to obtain the most favorable conditions during progress of polymerization and conversion, has been long since identified by the applicant and has formed the subject-matter of previous applications for patent by the same applicants, more particularly the U.S. patent application No. 457,174 filed May 19, 1965 and now abandoned.

The present invention constitutes, inter alia, a development and an integration of said ideas and encompasses the identification of the critical conditions under which said ideas can be practically embodied in the actual field of the industrial preparation of spinnable solutions of the kind considered herein.

Examples of actual reduction to practice of the invention are tabulated in the table hereinafter. These examples refer to different applications and uses of ratios, conditions and values as shown in the preceding tables. The components and the quantities shown in the following table are expressed on a weight basis, assuming that the total weight of the reaction mass is 100. At the foot of the table aforesaid, a few qualitative values of the obtained copolymer are also reported.

The values of relative viscosity have been obtained from the ratio of the viscosity of a solution of 0.5 gm. of the copolymer in 100 mls. of DMF solvent, to the viscosity of the solvent, as determined at 20° C., that is, the ratio $\eta_s/\eta_0$, and the molecular weight has been determined with the conventional analytical means on the basis of the values of the relative viscosity.

Obviously, commercial ACN contains water, which generally is in the order of 0.7%. Since the process includes the recovery of the unconverted fraction of the monomer, in which all the water is contained, it has been considered that the entire water content is stabilized around a value of 2.5–3%. Thus this value should be assumed as being present in the ACN considered in the foregoing example survey.

To complement what has been set forth in the foregoing, a detailed disclosure follows of the association and coordination of the means provided to the end of the practical industrial performance of the instant process as diagrammatically illustrated in the accompanying drawings; these also contain practical suggestions for the evolution of the process which leads, via said polymerization and distillation steps, to the obtention of the expected spinnable solution.

In the drawings:

FIGURE 3 is a graphical illustration of the negative variations of the dimethylformamide and acrylonitrile contents during the distillation stage.

Figure 1:
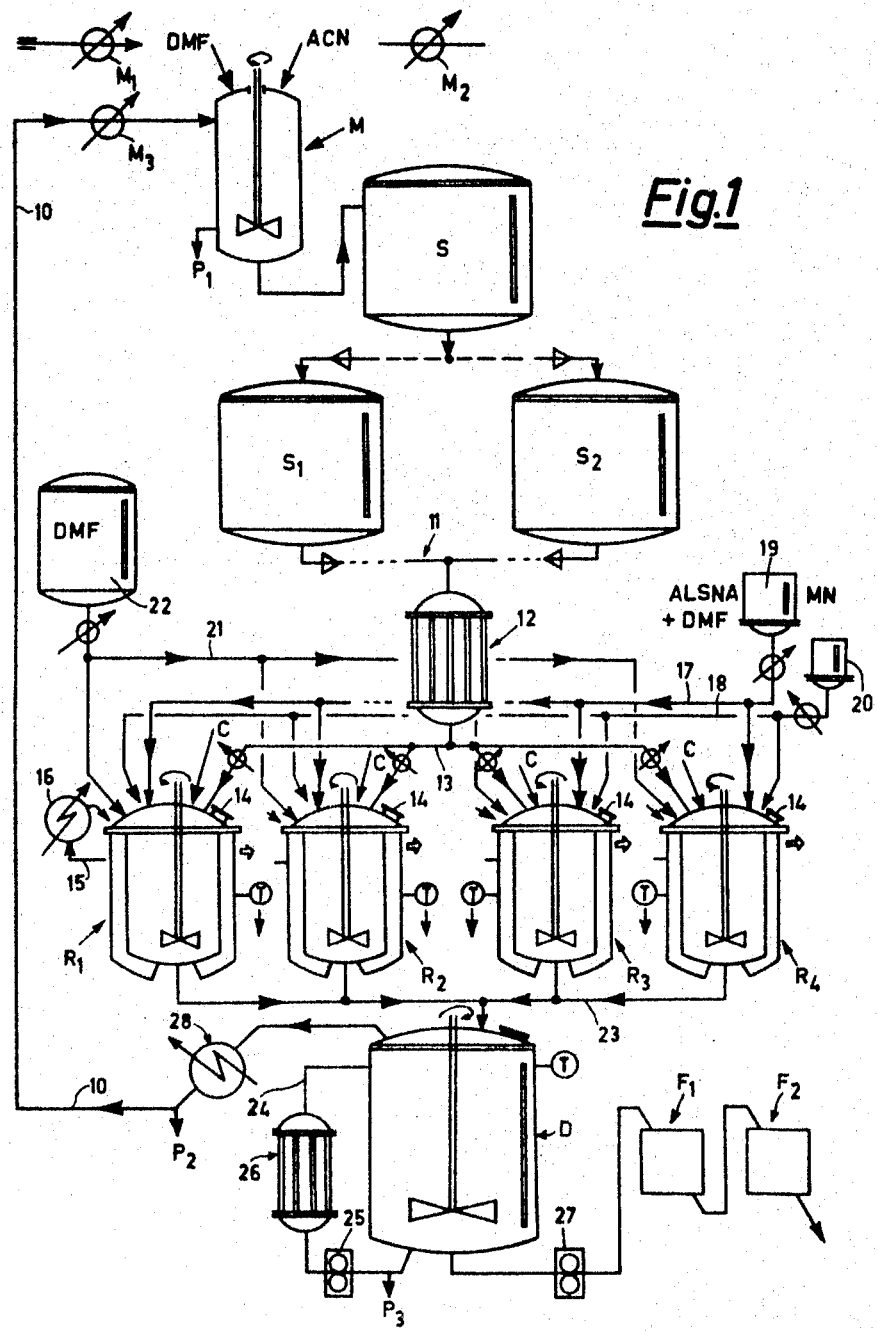
FIGURE 1 is a block diagram of a complete installation adapted to operate according to the invention.

With reference to FIGURE 1:

Proceeding along the direction in which the starting materials (indicated in the above reported abbreviated symbols in the drawing) travel to the spinnable solution, the installation generally comprises at least a mixer M in which, after volumetric metering in metering devices M1 and M2, acrylonitrile and dimethyl formamide are introduced in volumetrically metered quantities for obtaining the expected ratios, taking into account that into this mixer there is also introduced, through a recovery path 10, the recovered unconverted dimethylformamide/acrylonitrile mixture, a mixture which, in turn, is metered by a volumetric metering device M3. During the operation of said mixer samplings are effected at P1 for checking the composition of the solution. Additions of dimethylformamide and/or acrylonitrile can be made to said mixer, whenever said additions become necessary to allow for possible composition variations which had

EXAMPLES

| | Example No. | | | | | |
|---|---|---|---|---|---|---|
| | 1 | 2 | 3 | 4 | 5 | 6 |
| Tot. react. mass | 100 | 100 | 100 | 100 | 100 | 100 |
| Total DMF fed into reactor | 206 | 113 | 210 | 202.5 | 196.5 | 396 |
| Distilled, DMF | 35 | 17.5 | 45 | 27.5 | 35 | 64 |
| ACN fed into reactor | 50 | 30 | 60 | 50 | 50 | 80 |
| Distilled ACN | 12.5 | 7.5 | 15 | 10 | 12.5 | 16 |
| Ratio of dist. ACN/DMF | 0.358 | 0.428 | 0.334 | 0.364 | 0.358 | 0.25 |
| Spinnable solution | 213.8 | 121 | 214 | 220.3 | 202 | 398 |
| ACN (monom.) contained in spinn. soln. | ~0 | ~0 | ~0 | ~0 | ~0 | ~0 |
| Copolymer, PAN | 37.5 | 22.5 | 45 | 40 | 37.5 | 64 |
| Copolymer, MM | 5 | 2 | 3.5 | 5 | 2.45 | 2 |
| Copolymer, ALSNA | 0.32 | 0.95 | 0.59 | 0.3 | 0.545 | = |
| Total copolymer | 42.82 | 25.45 | 49.09 | 45.3 | 40.495 | 66 |
| Solvent, DMF | 171 | 95.5 | 164.9 | 175 | 161.5 | 332 |
| Mol. wt | 60.000 | 50.000 | 35.000 | 55.000 | 60.000 | 80.000 |
| Ave. rel. visc., $\eta$ | =2.2 | =1.98 | =1.87 | =2.07 | =2.2 | =2.5 |
| Init. ACN soln. in DMF (Ex. of Table I) | C/I | B/I | D/I | C/I | C/I | E/I |
| Init. mixture (Ex. of Table II) | C/II | A/II | E/II | C/II | D/II | F/II |
| Init. pressure (Ex. of Table III) | E/III | A/III | C/III | E/III | E/III | = |
| Init. temp. (Ex. of Table IV) | B/IV | A/IV | C/IV | B/IV | D/IV | B/IV |
| Catalyst (Ex. of Table V) | A/V | A/V | A/V | B/V | A/V | A/V | taken place due to an imperfect introduction, in said mixer, of the two components of said solution.

From said mixer M the solution is preferably introduced into a first tank S which can alternatively feed different storage tanks S1 and S2 to ensure a continuous feed to the operative components proper of the installation to which said storage tanks are thus alternatively connected via a suitable duct system 11.

The feeding of the polymerization reactors, for example a set comprising four reactors R1, R2, R3 and R4 is made through a heat-exchanger 12, through which the temperature of the solution is caused to rise to the initial polymerization value, the solution being then apportioned by a circuit 13, among said reactors after a volumetric metering at the input of each reactor.

The reactors are made and equipped with instruments adapted to the evolution and control of the polymerization process only. They comprise for example temperature and pressure regulators and indicators, of the telemetering type, so that it is possible to derive therefrom signals for controlling vacuum-forming means intended to maintain within the individual reactors the conditions of negative pressure which are caused to vary in a programmed manner during the evolution of the polymerization run. Said reactors can be advantageously equipped with peep-holes 14 for visually checking the process.

According to an already pointed out feature of the invention, the polymerization process is caused to occur, for control of its development, at the boiling point, thus obtaining the dissipation of the reaction heat by distilling as a continuous operation the monomer and the solvent without removing said propducts from the reactor: thus every reactor is equipped with a suitable circuit 15 which comprises a condenser and heat-exchanger 16, these component parts being shown associated only with the left-hand reactor R1 for reason of simplicity and clarity of the drawings.

Moreover, the individual reactors are connected to circuits 17 and 18 for the volumetrically metered feed of the solution of sodium allylsuphonate and dimethylformamide from a tank 19 as well as of methyl methacrylate from a reservoir 20. Each reactor, moreover, is equipped with means for feeding catalysts at C, in powder form or in solution, and with connection with nitrogen sources so as to ensure the formation of an inert atmosphere in the reaction environment and with any other means which are necessary to ensure a regular and safe development of the polymerization processes.

Inasmuch as, according to an important feature of the invention, during progress of polymerization metered additions of dimethylformamide are effected, the reactors are also connected to a further circuit 21 connected, in turn, to a tank 22.

The outlets of the reactors are connected, in parallel, via a circuit 23, to the input of the distiller D to which the outlets of said reactors thus converge so that in said distiller there are characteristics which correspond to the average of the individual characteristics of the products drawn at the outputs of the individual reactors. Thus, there is obtained the effect of smoothing out the possible irregular characteristics of the evolutions of polymerization processes in the individual reactors.

The distiller D, in which the distillation stage only is performed, can thus be structurally conceived and implemented in the condition which is most favorable to the performance of a single stage. It can have, for example, a monomer and solvent fractionating column so as to recover an acrylonitrile-dimethylformamide solution having a constant composition, a circuit 24 comprising a recycling pump 25 and a heat-exchanger 26 having a suitable surface area of heat exchange so as to supply within a short period of time the heat which is necessary to remove the unreacted monomer.

Since the spinnable solution has a low heat transfer coefficient, the adoption of said means makes possible a desirable rapid absorption of heat, inasmuch as said means bring about conditions which cannot be obtained within a polymerization autoclave (obviously a jacketed one) if distillation were carried out in the polymerization environment.

The qualitative control of the spinnable solution can be made for example at P3 and, once the desired characteristics are obtained, the distillation run is discontinued and the feed of spinnable solution to the spinnerets is started by a pump 27, upon passing through filtering devices and possible de-aerating devices in the conventional way. The feed of spinnable solution to the spinneret can also be made by a circuit branched off from the heat-exchange circuit 24, for example by branching off at the outlet of the pump 25.

The distillate is sent to the recycling and recovery circuit 10, after passing through a condenser 28 downstream of which samples can be taken at P2 for checking the acrylonitrile/dimethylformamide ratio, that is for checking the distillation course. In practice said control means permits identifying with accuracy the terminal point of the distillation run, which is whenever the sampling at P2 reveals the presence of dimethylformamide only, without any traces of acrylonitrile, that is the total removal of the unconverted monomer fraction is identified.

Thus qualitative control of the attainment of the expected characteristics of the spinnable solution is made by associating the controls of the samples taken at P2 and at P3, which indicate the total removal of the monomer and the attainment of the solvent to copolymer ratios which are most suitable for spinning, respectively.

Figure 2:
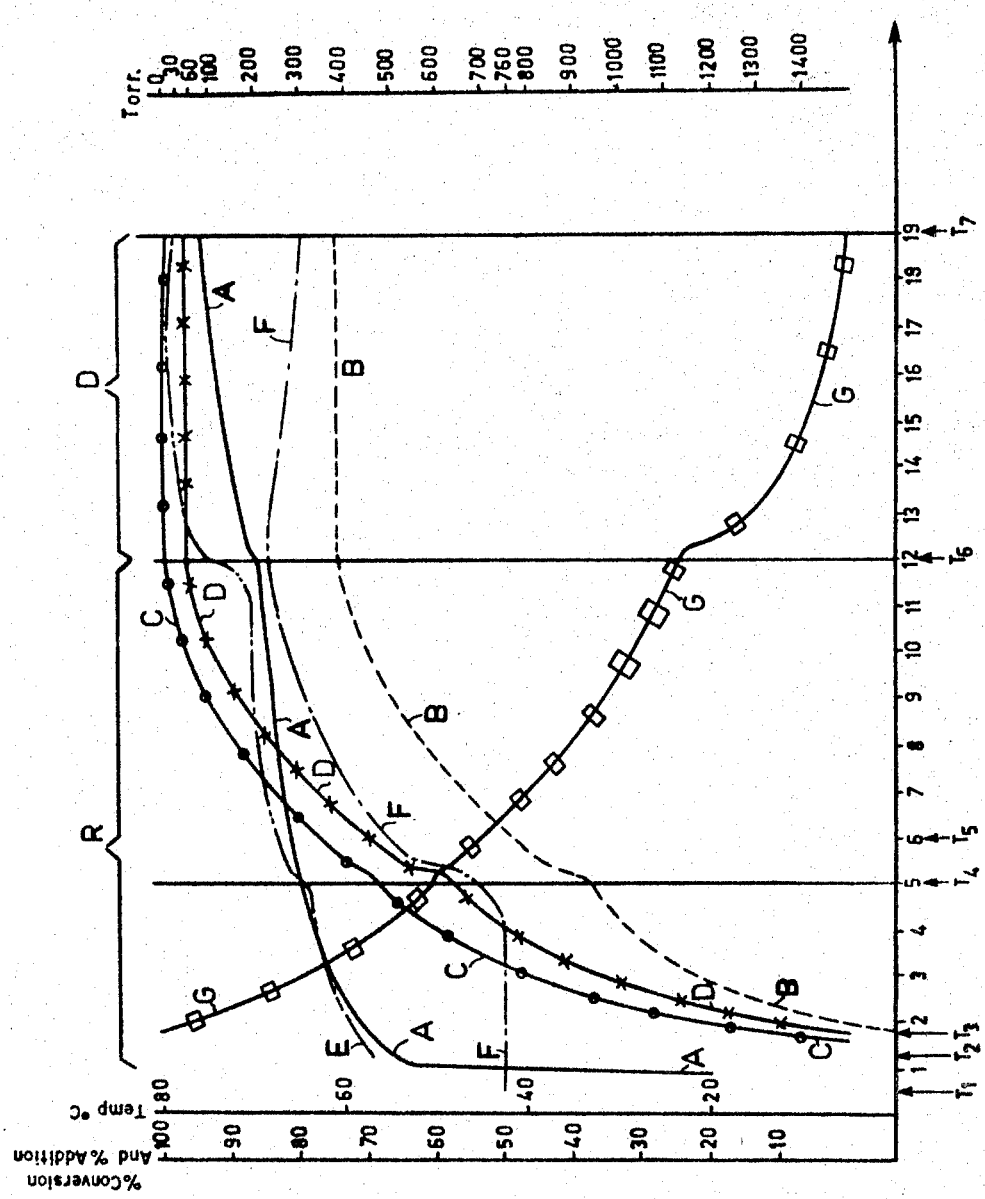
FIGURE 2 is a graph which reproduces in a general way the trend of the temperatures, pressure and physical magnitudes and phenomena which obtain throughout said steps.

The close interaction between the values of negative pressure within the reactors, the sequentially introduced amounts of solvent, with respect to the evolution of the reaction and of the conversions, will become apparent from a look at the graph shown FIG. 2.

This graph shows a case of performance of the sequence of copolymerization stages of an acrylonitrile solution according to the Example C/I of Table I, in a co-monomeric mixture corresponding to the Example C/II of Table II, starting from conditions of pressure and temperature which substantially correspond to the Example E/III of Table III and E/IV of Table IV, respectively and, finally, by employing the catalyst suggested in the Example A/V of Table V.

The graph of FIG. 2 reports several curves which indicate, as a function of the time of treatment, given in hours, the conversion percentages of the several monomers, the temperatures, in degrees Centigrade, and the residual pressure, in torr (=residual millimeters of mercury).

In the graph, the cure A—A is indicative of the trend of temperature; the curve B—B, the percentage of acrylonitrile conversion; the curve C—C the percentage of methyl metacrylate conversion; and the curve D—D the percentage conversion of sodium allyl sulphonate.

The curve E—E shows the trend of the residual pressures in the several environments wherein the process takes place; the curve F—F shows the percentage content of dimethylformamide vs. the whole mass which is present in the reactors and then in the distiller and, finally, G—G shows in percentage values with respect to the initially fed-in quantities, the unconverted acrylonitrile which is present in said environment at every instant of time.

In the time scale T1–T2 is the time at which the reactors are charged, whereas the time T2–T3 corresponds to the introduction of the catalyst and thus to the start of polymerization.

The first stage of polymerization takes place at the time T3–T4, whereas the subsequent time, T4–T5 is the one during which dimethylformamide is added (as can be seen from the trend of the curve F—F) which gives rise to the second polymerization stage at the time T5–T6.

The several points of inflection which can be seen on the curves are indicative of the variations in the trend of reaction velocity, as caused by said additions.

Thus, up to the instant T6 the graph shows the trend of the phenomena which takes place within the reactors, as indicated by the bracket R placed above the graph itself. Said instant corresponds thus to the transfer of the reactors' contents into the distiller D, wherein the production process of the spinnable solution will be being completed (bracket D).

More particularly, it is observed how during the time T6–T7 all of the unconverted acrylonitrile is done away with, while concurrently there is reduced in a gradual manner the dimethylformamide content with respect to the mass, so as to attain the ratio, which is most favorable, of polymer and solvent, while the increase of the distillation temperature, as shown by the curve A—A, corresponds to the gradual disappearance of the monomer which has the lowest distillation temperature.

In the same graph it is possible, finally, to observe how the conversion of the remaining comonomers (methyl metacrylate and sodium allylsulphonate) is virtually completed in the co-polymerization process.

Even though the curves reported in the graph have been traced as a result of repeated readings taken at suitable intervals, it is apparent that said curves are merely indicative of the several trends and increments; and thus the values which can be derived from the graph should not be regarded as absolute or limiting the scope of the invention.

The graph of FIG. 3 shows couples of curves among which are comprised limiting values which are acceptable for removing acrylonitrile from the distiller D, and also for the amount of dimethylformamide which is left, during the time T6–T7 of the distillation process.

The area F'—F' encompasses the progression of the limits of the instantaneous contents of dimethylformamide, resulting from the curve F—F of FIG. 2, whereas the area G'—G' encompasses the limits of the progressive removal of acrylonitrile (curve G—G of FIG. 2).

It can thus be seen that, even admitting wide variations of the monomer removal during progress of distillation, it is necessary that narrow limits be abode by for the total removal at the end of the process, whereas variations of the final content of dimethylformamide are tolerated without jeopardizing the spinnability qualities of the solution.

The instants and the times as considered above are referred in turn, in an exemplary way, to the values as reported in hours on the abscissae of the plot of FIG. 2.

It is obvious that the process and the installation according to the invention can have many variations and modifications according to the convenience and requirements of layout and association of said installation with the spinning means, and, obviously, also to the capacity of the installation. For example, the installation has been described and shown in an exemplary embodiment wherein a set of four reactor, connected in parallel and concurrently feeding a single distiller, is employed. Said number has been considered suitable for ensuring a satisfactory statistical smoothing-out of the qualitative characteristics of the solutions of the copolymers produced in the individual reactors. It is however apparent that an equivalent installation might comprise more or less than four reactors. Furthermore, a high-throughput complete installation could comprise a plurality of reactor sets, each associated to a single distiller. In this case it is possible to use a storage set or a different number of storage sets comprising two or more storage tanks, individually or also conjointly connected to one or more preheating means for feeding the one or the other of said sets, to the end of ensuring the continuity of the production of the spinnable solution and thus also of the feeding of the corresponding spinnerets.

For these reasons it should be understood that the foregoing and other modifications and variations of means and modes lie within the scope of this invention, along with those defined in the appended claims, both individually and in any possible combinations thereof.

What is claimed is:

1. An installation for the industrial production of spinnable solutions of a copolymer produced from co-monomers of which one is acrylonitrile, comprising means for mixing acrylonitrile and a solvent therefor,
a pair of storage tanks connected to said mixing means for receiving and storing the solution resulting from said mixture,
heating means,
means for alternately conducting the mixture from the two storage tanks to said heating means to heat the solution to a temperature close to the initial polymerization temperature,
a plurality of reactors connectable alternately with said heating means to receive the heated mixture from said heating means,
means for separately supplying selectively to said reactors, after said mixture has passed through said heating means, volumetrically metered amounts of additional solvent and of a comonomer,
    means for also supplying to said reactors a catalyst,
    a single distiller and heating means therefor,
means connecting said reactors in parallel to said distiller so that said distiller receives and combines the discharges from said reactors and removes by distillation from said discharges the unconverted acrylonitrile and the amount of solvent in excess of the concentration required for the spinnable solution,
discharge means for feeding the spinnable solution from said distiller to a spinneret,
and discharge means from said distiller for recycling the unconverted acrylonitrile and the excess solvent to said mixing means.

2. An installation for the industrial production of a spinnable solution of a copolymer produced from co-monomers, of which one is acrylonitrile, comprising
    a mixer for mixing acrylonitrile and dimethylformamide,
    a first storage tank connected to said mixer for receiving and storing the resulting mixture,
    a pair of tanks,
    means connecting said pair of tanks to said first tank to receive said mixture from said first tank alternately,
    heating means,
    means for alternately conducting said mixture from the two tanks of said pair of tanks to said heating means to enable said mixture to be heated close to the required polymerization temperature,
    at least three reactors,
    means for connecting said heating means to said three reactors to deliver the mixture from said heating means alternately to the three reactors,
    an additional storage tank for holding dimethylformamide,
    means for delivering a volumetrically metered amount of a copolymer to said reactors after the mixture has passed through said heat exchanger,
    means for delivering a catalyst into said reactors, to obtain copolymerization and partial conversion of the acrylonitrile,
    metered control means for delivering dimethylformamide from said additional storage tank selectively to said reactors after passage of the mixture through said heating means and during progress of copolymerization,
    a single distiller and heating means therefor,
    means connecting said reactors in parallel to said distillers so that said distiller receives and combines the discharges from said reactors and removes therefrom the unconverted acrylonitrile and the amount of solvent in excess of the concentration required for the spinnable solution, means for feeding the spinnable solution from said distiller to a spinneret, and means for recycling the unconverted acrylonitrile and the excess solvent to said mixer.

3. An installation as claimed in claim 1 having a second heating means outside said distiller, means for forced circulation of the solution through said distiller and second heating means during distillation, means in said recycling means for condensing the distillate from the distiller, liquid-drawing means downstream of said condensing means, and means for drawing off liquid from the circuit which includes the distiller and second heating means.

4. An installation as claimed in claim 3, wherein volumetric metering means is provided at the input of each reactor to control the amount of solution fed into each reactor.

5. An installation as claimed in claim 2, wherein additional volumetric metering means are provided to meter supply of acrylonitrile and dimethylformamide initially to said mixing means and to meter the supply to said mixing means, through said recycling means, of the unconverted acrylontrile and excess solvent.

References Cited

UNITED STATES PATENTS 2,556,851  6/1951  Ohsol et al. _____ 260—96 XR

JAMES H. TAYMAN, JR., Primary Examiner

U.S. Cl. X.R.

23—260; 202—160; 203—1, 2, 3; 260—32.6, 85.5, 95